Feb. 6, 1923.

J. QUICKENDEN. ET AL.
POTATO HARVESTER.
FILED JUNE 24, 1920.

INVENTORS
James Quickenden
Henry J. Weidemann
By Erwin Wheeler and J. Woolard
ATTORNEYS.

Feb. 6, 1923.
J. QUICKENDEN. ET AL.
POTATO HARVESTER.
FILED JUNE 24, 1920.
1,444,006
2 SHEETS-SHEET 2
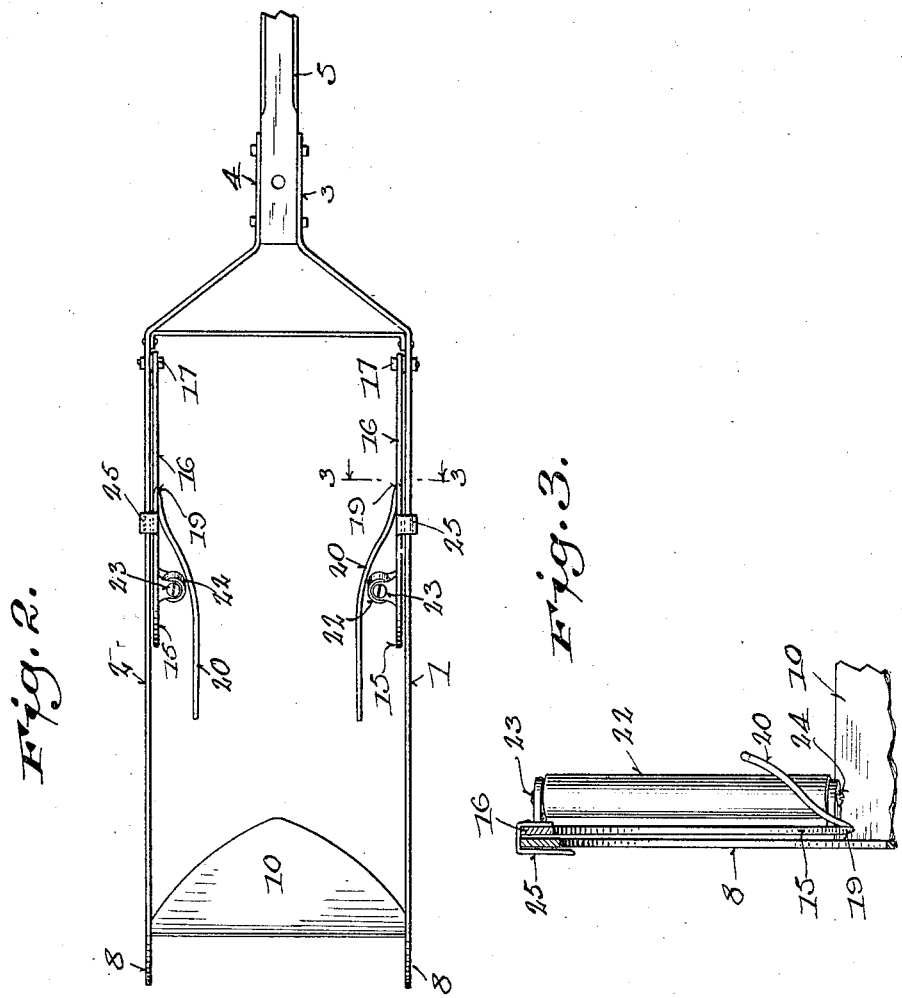

Patented Feb. 6, 1923.

1,444,006

UNITED STATES PATENT OFFICE.

JAMES QUICKENDEN AND HENRY J. WEIDEMANN, OF COLUMBUS, WISCONSIN.

POTATO HARVESTER.

Application filed June 24, 1920. Serial No. 391,341.

*To all whom it may concern:*

Be it known that we, JAMES QUICKENDEN and HENRY J. WEIDEMANN, citizens of the United States, residing at Columbus, county of Columbia, and State of Wisconsin, have invented new and useful Improvements in Potato Harvesters, of which the following is a specification.

Our invention relates to improvements in potato harvesters and pertains especially to improvements in devices for preventing potato vines from interfering with the harvesting operation either by reason of their becoming entangled in or upon portions of the machine or by reason of their contributing to the concealment of potatoes beneath vines or turned soil after such potatoes have been lifted by the plow.

Our invention is illustrated in the drawings of this application as applied to a potato harvesting machine of the general type disclosed in Letters Patent of the United States to J. P. Brennan, numbered 973,852, and dated Oct. 25, 1910, but the use of our improvement is not limited to harvesters of that type, the same being applicable to any form of potato harvester with varying degrees of effectiveness dependent upon the character of the machine to which the improvement is applied.

While the general object of our invention is to gather the vines in advance of the potato lifting plow and arrange them at one side of the line or lines along which the plow supporting shanks travel, a more specific object of the invention is to provide effective means for deflecting the vines inwardly from both sides of a row of potatoes toward the center of the line along which the plow point travels and holding them in such position until the potatoes have been lifted by the plow whereby the vines will pass freely with the potatoes upwardly over the rear margin of the plow blade and whereby in a machine of the type disclosed in said prior patent to J. P. Brennan, the vines and potatoes may be conveyed rearwardly and upwardly along a set of supporting parallel bars which serve as a screen to separate the potatoes from the earth which has been lifted by the plow.

In the accompanying drawings:

Fig. 1 is a side elevation of a potato harvesting machine similar to that disclosed in said former patent to J. P. Brennan with our invention embodied therein as an attachment to the draw bars thereof.

Fig. 2 is a fragmentary plan view of an embodiment of our invention as attached to the draw bars of the machine shown in Fig. 1 and showing the relation of our improved vine gathering attachment to the plow.

Fig. 3 is a sectional view drawn on line 3—3 of Fig. 2 and showing a fragment of the plow and one of the plow supporting shanks in associated relation to the illustrated vine gatherer.

Figure 1:
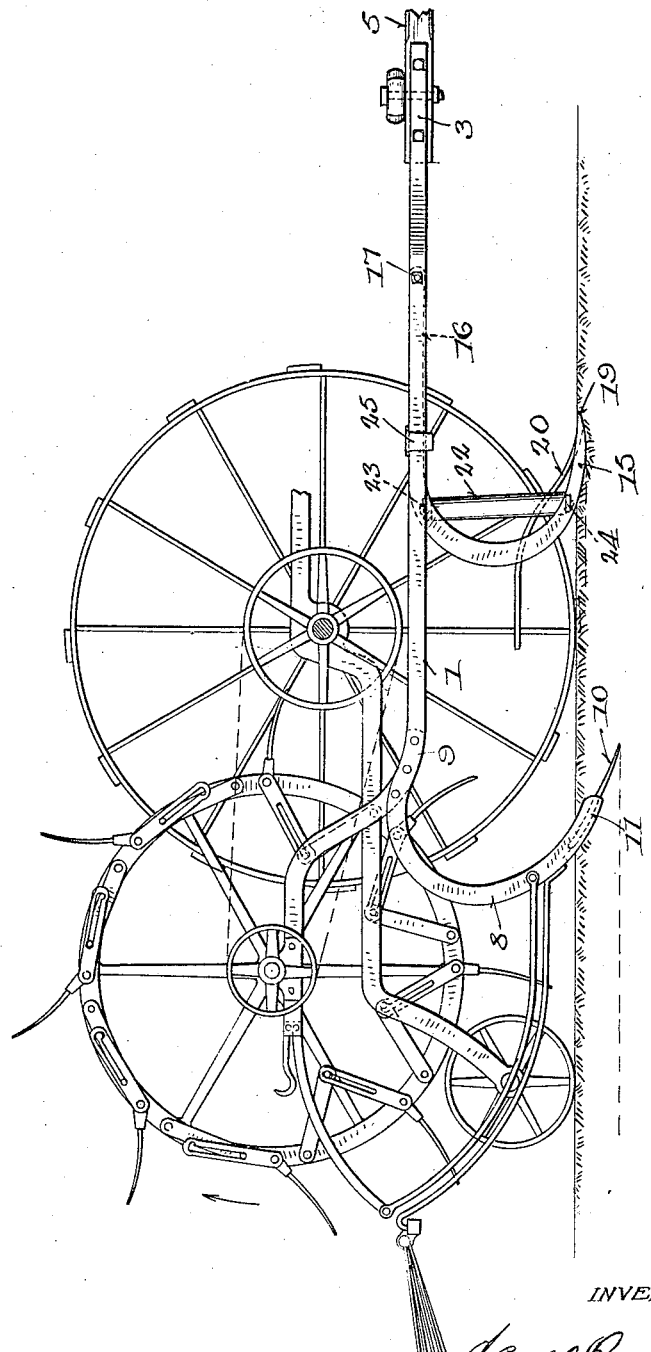

The members 1 and 2 of the potato harvesting machine converge near their front ends and are provided with parallel portions 3 and 4 between which the tongue 5 is secured. Curved plow supporting shanks 8 are secured to the respective beams 1 and 2 as shown at 9, and at their lower ends are secured to the side margins of the plow blade 10 as indicated at 11. The plow blade 10 and its supporting shanks 8 may be assumed to be of any ordinary construction, such for example, as shown in said former patent.

But it will be observed that we have provided hook-shaped rake teeth 15 each located in front of one of the plow supporting shanks 8 and provided with a forwardly projecting supporting arm or shank 16 pivoted to the associated plow beam at 17. The lower end of the rake tooth 15 is provided with a sharp point 19, and a deflecting rod 20 is secured to the rake tooth adjacent to the point 19 and extends upwardly and inwardly along curved lines to a short distance above the ground and then rearwardly along a line substantially parallel with the rake tooth to and beyond the upwardly curving portion thereof, terminating a short distance in front of the plow shank 8.

A roller 22 journalled in suitable bearings 23 and 24 on the inner face of the rake tooth is disposed between the plane of the rake tooth and the vine deflecting rod 20. The axis of this roller is preferably slightly inclined to a vertical line and extends downwardly and forwardly from the upper bearing 23 to the lower bearing 24 whereby the tendency which might otherwise exist for the vines to be crowded downwardly along the roller into contact with the rake point and deflecting rod is avoided, the inclination of the roller being such as to offset this tendency and hold the vines up where they will be effectively deflected and arranged in proper position by the rod 20.

It will be observed in Fig. 2 that the rake teeth are each fastened to the inner side of the associated beam 1 (or 2), and that the rod 20 in each case curves inwardly from the point of the rake tooth. The rollers 22, being also disposed on the inner side of each rake tooth, and the machine being operated to draw the point of the plow 10 along the center of the line of a row of potatoes, it is obvious that the vines will necessarily be deflected towards such center of the line and arranged longitudinally of the plow by the combined action of the rake teeth, the deflecting rods 20, and rollers 22. This arrangement of the vines along the center line of the row of potatoes is peculiarly effective by reason of the fact that the vines are held by their roots while being thus arranged, the operation of the plow occurring after the vines have been so arranged owing to the fact that the rake teeth are located at a substantial distance in front of the plow.

The bars or shanks 16, which support the rakes, are preferably provided with offset metal clips or brackets 25, the horizontal portions of which project across the respective plow beams 1 and 2 and downwardly along the outer side of said beams. The function of these brackets is to limit the downward movement of the rake teeth which would otherwise plow deeply into the soil. The brackets are preferably so disposed as to allow the points of the rake teeth to enter into the soil for a short distance, preferably to a depth of one or two inches, whereby the points of the rake teeth are so positioned that they will invariably pass underneath the vines. The object of pivotally connecting the rake teeth with the plow beams at 17 is to allow the teeth to yield and swing upwardly when contacting with unyielding objects, such as stones. By locating the pivotal connection at a substantial distance in front of the points of the teeth, it is possible to avoid having the teeth catch upon ordinary stones in such a manner as to break them.

Experiments which have been conducted with the vine gathering apparatus above described have demonstrated that the rollers 22 are of great importance to the success of the gathering attachment. These rollers rotate freely and deflect the vines inwardly with great freedom when the vines are being lifted by the rake teeth with a tendency to drag them forwardly while they are being retained by their roots at their lower or inner ends. But it has been found by experiment that if the rollers are omitted, the vines and particularly green vines, have a tendency to catch and bend across the upwardly curving portions of the rake teeth with sufficient retention to allow their roots to be pulled from the soil. In such cases, the vines will mass upon the rake teeth in such quantities as to make it necessary to stop the machine and clear them away, whereas when the rollers are employed this tendency to clog is obviated and the vines are therefore lifted successively by the plow and carried with the potatoes over the separating screen, both the vines and the potatoes being therefore deposited upon the top of the soil instead of being wholly or partially buried therein.

We claim:

1. A vine arranging attachment for potato harvesters comprising a rake tooth provided with a shank adapted to be pivotally connected to the harvester frame and having a downwardly and forwardly curving point, in combination with a guard rod connected with the rake tooth near the point, and extending upwardly and rearwardly along the inner side of the tooth in a position to deflect and hold potato vines in proximity to the center line of the row of potatoes, said rake tooth being also provided with a rotary member adapted to be actuated by the vines and positioned to serve as a guard to prevent clogging of the vines upon said rake tooth.

2. A vine arranging attachment for potato harvesters comprising a shank adapted to be pivotally connected with the harvester frame, a hook-shaped rake tooth connected with the shank, means for limiting the downward movement of the rake tooth into the soil, and means for preventing the vines from clogging upon said tooth.

3. The combination with a potato harvester having a plow and a set of plow supporting shanks connecting the respective side margins of the plow with the harvester frame, of a set of vine lifting rake teeth pivotally connected with the frame at the respective sides thereof substantially in line with the plow supporting shanks, means for deflecting the vines lifted by said rake teeth inwardly towards the line along which the central portion of the plow moves, and means for preventing the vines from clogging.

4. The combination with a potato harvester having a plow and a set of plow supporting shanks connecting the respective side margins of the plow with the harvester frame, of a set of vine lifting rake teeth pivotally connected with the frame at the respective sides thereof substantially in line with the plow supporting shanks, means for deflecting the vines lifted by said rake teeth inwardly towards the line along which the central portion of the plow moves, and means for preventing the vines from clogging upon the rake teeth, said vine deflecting means extending rearwardly toward the plow to prevent the vines from swinging outwardly in the paths of the plow shanks.

5. The combination with a potato harvester having a plow and a set of plow supporting shanks connecting the respective side margins of the plow with the harvester frame, of a set of vine lifting rake teeth pivotally connected with the frame at the respective sides thereof substantially in line with the plow supporting shanks, means for deflecting the vines lifted by said rake teeth inwardly towards the line along which the central portion of the plow moves, means for limiting the downward movement of the rake teeth while allowing them to freely swing upwardly.

6. In a potato harvester provided with a lifting plow, the combination of a set of rake teeth pivotally connected with the frame substantially in line with the respective sides of the plow and having downwardly and forwardly projecting points, a roller journalled upon the inner side of each rake tooth and adapted to rotate about an upwardly extending axis under pressure exerted by the vines.

7. In a potato harvester provided with a lifting plow, the combination of a set of rake teeth pivotally connected with the frame substantially in line with the respective sides of the plow and having downwardly and forwardly projecting points, a roller journalled upon the inner side of each rake tooth and adapted to rotate about an upwardly extending axis under pressure exerted by the vines, the axis of said roller being inclined downwardly and forwardly to cause the vines to lift toward the upper end thereof.

8. In a potato harvester provided with a lifting plow, the combination of a set of rake teeth pivotally connected with the frame substantially in line with the respective sides of the plow and having downwardly and forwardly projecting points, a roller journalled upon the inner side of each rake tooth and adapted to rotate about an upwardly extending axis under pressure exerted by the vines, and a guard finger connected with each tooth near its point and curving upwardly and rearwardly around said roller and provided with a rear end portion extending substantially horizontally toward the plow.

9. In a potato harvester provided with a lifting plow, the combination of a set of rake teeth pivotally connected with the frame substantially in line with the respective sides of the plow and having downwardly and forwardly projecting points, a roller journalled upon the inner side of each rake tooth and adapted to rotate about an upwardly extending axis under pressure exerted by the vines, said rake teeth being sufficiently in advance of the plow to operate upon and arrange the vines before their roots are freed by the plow.

10. In a potato harvesting machine, the combination with a lifting plow supported from the machine frame at its side margins and provided with separating devices operative upon the lifted material to separate the earth from the potatoes, of a set of hook-shaped rake teeth provided with elongated shanks pivotally connected with the frame, clips connected with said shanks and adapted to engage the frame in the rear of said pivotal connections to limit the downward movements of the shanks and teeth and a rotary member disposed across the arch of each tooth to deflect the vines inwardly and prevent them from clogging upon the teeth.

11. In a potato harvesting machine, the combination with a lifting plow supported from the machine frame at its side margins and provided with separating devices operative upon the lifted material to separate the earth from the potatoes, of a set of hook-shaped rake teeth provided with elongated shanks pivotally connected with the frame, clips connected with said shanks and adapted to engage the frame in the rear of said pivotal connections to limit the downward movements of the shanks and teeth and a rotary member disposed across the arch of each tooth to deflect the vines inwardly and prevent them from clogging upon the teeth, said rotary members each comprising an elongated roller journalled upon the inner side of the associated tooth and spanning the arch of the hookshaped portion of the tooth substantially as described.

12. The combination with a potato harvesting machine provided with a lifting plow supported from the machine frame at its side margins, of a set of rakes adapted to lift vines from the path of said plow supports, vine deflecting means adapted to press the vines inwardly, and vertical guides adapted to prevent entanglement of the vines upon the rake supports.

In testimony whereof we affix our signatures in the presence of two witnesses.

JAMES QUICKENDEN.
HENRY J. WEIDEMANN.

Witnesses:
DORA E. EDWARDS,
HERBERT L. ZIDLER.